(12) United States Patent
Hyde et al.

(10) Patent No.: US 8,373,563 B2
(45) Date of Patent: Feb. 12, 2013

(54) ELECTRONIC TAG AND METHOD FOR USING AN ELECTRONIC TAG CONFIGURED TO TRACK AT LEAST ONE PLANT

(75) Inventors: Roderick A. Hyde, Redmond, WA (US); Muriel Y. Ishikawa, Livermore, CA (US); Jordin T. Kare, Seattle, WA (US); Lowell L. Wood, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 817 days.

(21) Appl. No.: 12/283,299

(22) Filed: Sep. 9, 2008

(65) Prior Publication Data

US 2009/0231101 A1 Sep. 17, 2009

Related U.S. Application Data

(63) Continuation-in-part of application No. 12/077,066, filed on Mar. 14, 2008, now Pat. No. 8,279,066, and a continuation-in-part of application No. 12/215,674, filed on Jun. 27, 2008, now Pat. No. 8,258,951.

(51) Int. Cl.
*G08B 13/14* (2006.01)

(52) U.S. Cl. .................. 340/572.1; 340/572.8; 340/10.1

(58) Field of Classification Search ............... 340/572.1, 340/572.4, 572.8, 572.9, 539.11, 539.13, 340/539.22, 539.26, 10.1, 10.3, 10.4, 4.11, 340/4.14; 705/23; 405/45; 47/65; 702/2, 702/5; 235/375, 385; 342/357.48, 357.62; 227/147, 152; 81/23
See application file for complete search history.

(56) References Cited

U.S. PATENT DOCUMENTS

| | | | |
|---|---|---|---|
| 4,379,372 A | 4/1983 | Alexander et al. | |
| 4,570,368 A | 2/1986 | Stover | |
| 4,972,616 A | 11/1990 | Doll | |
| 5,339,517 A | 8/1994 | Diemer | |
| 5,669,327 A * | 9/1997 | Beebe | 116/209 |
| 6,597,465 B1 | 7/2003 | Jarchow et al. | |
| 6,671,698 B2 | 12/2003 | Pickett et al. | |
| 6,701,665 B1 | 3/2004 | Ton et al. | |
| 6,745,127 B2 | 6/2004 | Crosby | |
| 6,888,458 B2 | 5/2005 | Carlson | |
| 6,963,881 B2 | 11/2005 | Pickett et al. | |
| 7,076,900 B2 | 7/2006 | Faulkner | |
| 7,080,577 B2 * | 7/2006 | Latschbacher et al. | 81/23 |
| 7,143,066 B2 * | 11/2006 | Shear et al. | 705/54 |

(Continued)

FOREIGN PATENT DOCUMENTS

JP 2006/101739 A * 4/2006
WO WO 2004/023377 A1 3/2004

(Continued)

OTHER PUBLICATIONS

Data Identifier and Application Identifier Standard, American National Standard, Material Handling Industry (Oct. 9, 2006), pp. 1-110.

(Continued)

*Primary Examiner* — Van T. Trieu
(74) *Attorney, Agent, or Firm* — Workman Nydegger

(57) ABSTRACT

A system for tracking at least one plant includes an electronic tag including an interrogation interface and memory circuitry and a package for the electronic tag, the package being configured for physical association with at least one corresponding plant. The package may be configured for self-contained physical association with the at least one plant. The electronic tag may be interrogated by multiple trading partners in a supply chain.

58 Claims, 14 Drawing Sheets

U.S. PATENT DOCUMENTS

| | | | |
|---|---|---|---|
| 7,200,804 B1 | 4/2007 | Khavari et al. | |
| 7,233,250 B2 | 6/2007 | Forster | |
| 7,316,202 B2 | 1/2008 | Fantin et al. | |
| 7,403,855 B2 * | 7/2008 | Fuessley et al. | 702/5 |
| 7,702,462 B2 * | 4/2010 | Fuessley et al. | 702/2 |
| 7,761,334 B2 * | 7/2010 | Pickett et al. | 705/23 |
| 7,798,746 B2 * | 9/2010 | Byles | 405/45 |
| 8,048,436 B1 * | 11/2011 | Whitworth | 424/411 |
| 2001/0029996 A1 | 10/2001 | Robinson | |
| 2002/0170229 A1 | 11/2002 | Ton et al. | |
| 2003/0066234 A1 * | 4/2003 | Bussey, Jr. | 47/65.7 |
| 2004/0088330 A1 | 5/2004 | Pickett et al. | |
| 2004/0088916 A1 | 5/2004 | Ton et al. | |
| 2005/0134461 A1 | 6/2005 | Gelbman et al. | |
| 2006/0022824 A1 | 2/2006 | Olsen, III et al. | |
| 2006/0080819 A1 * | 4/2006 | McAllister | 29/403.3 |
| 2006/0085266 A1 * | 4/2006 | Wei et al. | 705/15 |
| 2006/0116791 A1 | 6/2006 | Ravula et al. | |
| 2006/0220955 A1 * | 10/2006 | Hamilton | 342/357.13 |
| 2007/0044445 A1 | 3/2007 | Spicer et al. | |
| 2007/0079536 A1 | 4/2007 | Hall | |
| 2007/0152045 A1 | 7/2007 | Erickson et al. | |
| 2007/0185749 A1 | 8/2007 | Anderson et al. | |
| 2007/0222596 A1 | 9/2007 | Kleijn et al. | |
| 2007/0285229 A1 | 12/2007 | Batra et al. | |
| 2008/0074254 A1 | 3/2008 | Townsend et al. | |
| 2008/0129497 A1 | 6/2008 | Woodard et al. | |
| 2008/0220721 A1 | 9/2008 | Downie et al. | |
| 2008/0297350 A1 | 12/2008 | Iwasa et al. | |
| 2009/0042180 A1 | 2/2009 | Lafferty et al. | |
| 2009/0070037 A1 | 3/2009 | Templeton et al. | |
| 2009/0108997 A1 | 4/2009 | Petterson et al. | |
| 2009/0128336 A1 | 5/2009 | Huang et al. | |
| 2009/0319400 A1 | 12/2009 | Pratt | |
| 2010/0283584 A1 * | 11/2010 | McAllister | 340/10.1 |

FOREIGN PATENT DOCUMENTS

WO   WO 2007/042327 A1   4/2007

OTHER PUBLICATIONS

Hyde et al.; U.S. Appl. No. 12/077,066, filed Mar. 14, 2008.
Hyde et al.; U.S. Appl. No. 12/215,674, filed Jun. 27, 2008.

* cited by examiner

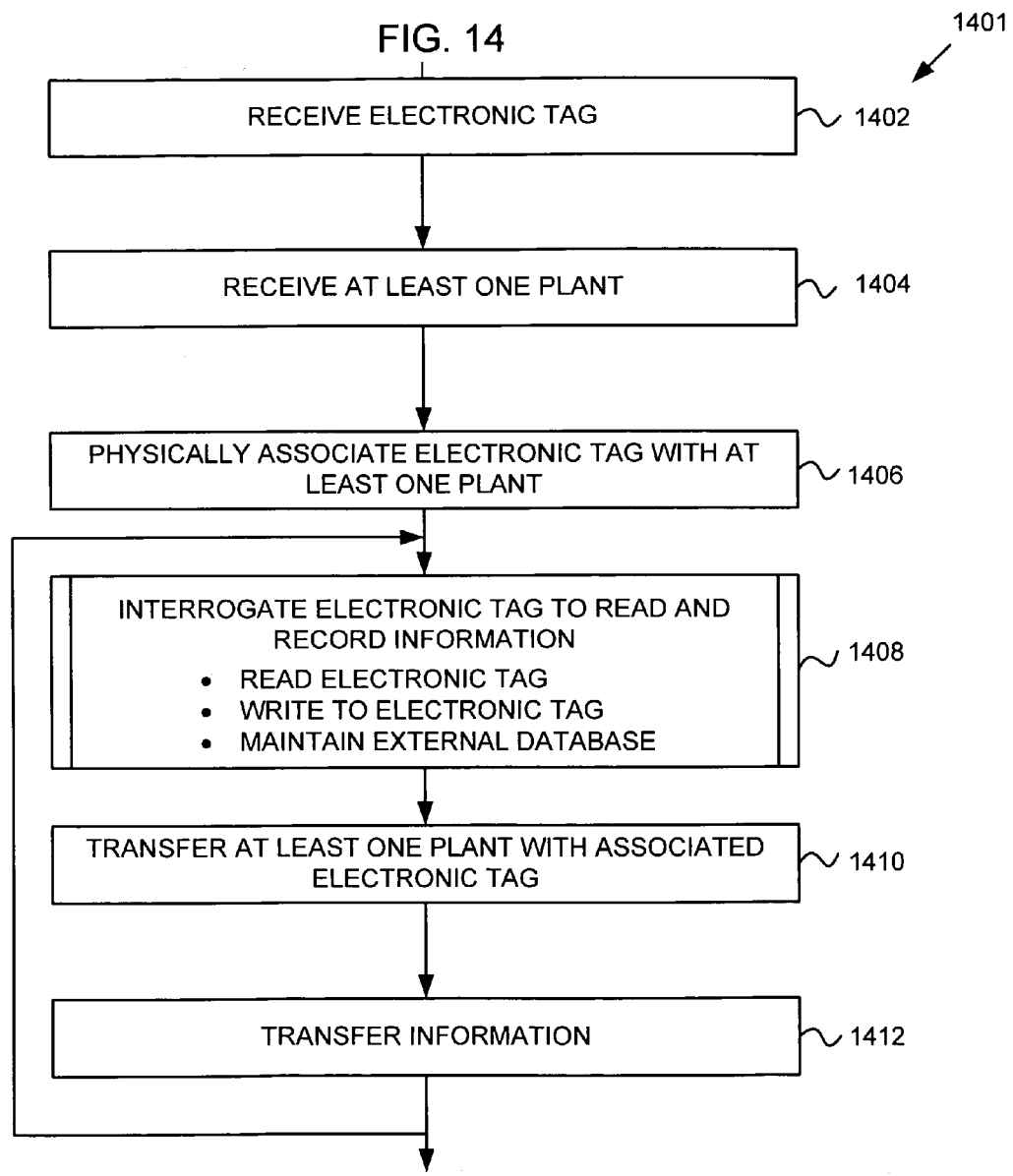

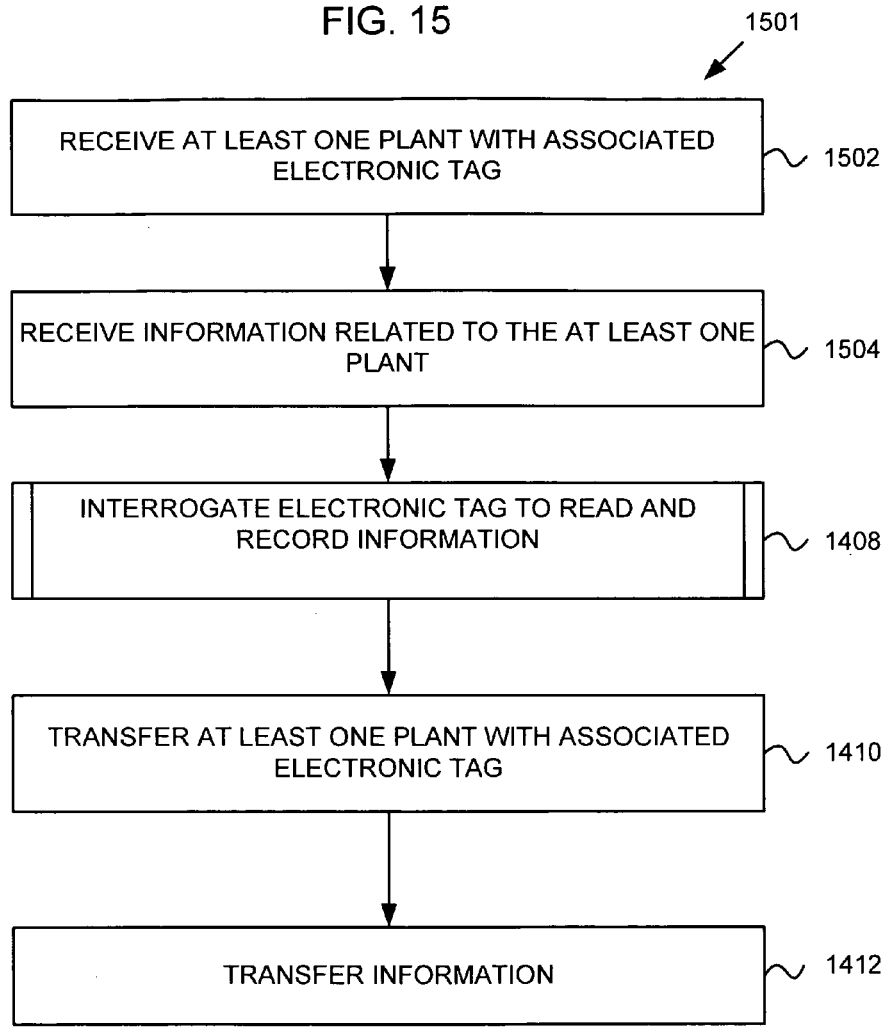

ELECTRONIC TAG AND METHOD FOR USING AN ELECTRONIC TAG CONFIGURED TO TRACK AT LEAST ONE PLANT

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application No. 12/077,066, entitled METHOD AND APPARATUS FOR TRACKING PLANTS WITH AN ELECTRONIC TAG, naming Roderick A. Hyde, Muriel Y. Ishikawa, Jordin T. Kare, and Lowell L. Wood, Jr. as inventors, filed Mar. 14, 2008 now U.S. Pat. No. 8,279,066.

For purposes of the USPTO extra-statutory requirements, the present application constitutes a continuation-in-part of U.S. patent application No. 12/215,674, entitled METHOD AND SYSTEM CORRELATING EXTERNAL DATA TO A PLANT WITH AN ELECTRONIC TAG, naming Roderick A. Hyde, Muriel Y. Ishikawa, Jordin T. Kare, and Lowell L. Wood, Jr. as inventors, filed Jun. 27, 2008 now U.S. Pat. No. 8,258,951.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s). All subject matter of the Related Applications and of any and all parent, grandparent, great-grandparent, etc. applications of the Related Applications is incorporated herein by reference to the extent such subject matter is not inconsistent herewith.

SUMMARY

According to various embodiments, electronic tags may be used to track plants or groups of plants at or during various stages of a supply chain. The plants may be tracked even if they are transferred between trading partners. The electronic tags may be interrogated, and data corresponding to information pertaining to associated respective plants may be saved or read. The data may be saved and read from read-write electronic tags, or saved and read from an external database using identification data read from an electronic tag, or both. Interrogated data may be used by a system to initiate processing of a transaction, verify receipt of goods, determine the location of at least one corresponding plant, or provide other input to one or more linked data processing systems.

According to another embodiment, an electronic tag may be configured for physical association with at least one plant or with another item that is, in turn, in physical association with the at least one plant.

According to other embodiments, the package of an electronic tag may include one or more coupling apparatuses or mechanisms for making self-contained physical association with at least one plant.

According to other embodiments, an electronic tag package may be configured as an item that may maintain physical association with at least one plant.

According to an embodiment, an electronic tag package may constructed, coated, heated, cooled, or otherwise treated to provide biocompatibility, compostibility, biodegradability, reduced danger during processing, resistance to chemical or physical assault, improved installation characteristics, improved interrogation performance, or improved aesthetic appearance to make the electronic tag better configured for physical association with at least one plant.

In one or more various aspects, related systems include but are not limited to circuitry and/or programming for effecting the herein-referenced method aspects; the circuitry and/or programming can be virtually any combination of hardware, software, and/or firmware configured to effect the herein referenced method aspects depending upon the design choices of the system designer.

In one aspect, a system includes but is not limited to an electronic tag interrogator to interrogate an electronic tag including a memory circuit and an interrogation interface; and the memory may include identification data corresponding to information about one or more associated plants. The system may include one or more remote resources for storing data corresponding to identification data read from and/or written to the electronic tag. In addition to the foregoing, other system aspects are described in the claims, drawings, and text forming a part of the present disclosure.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is not in any way limiting. Other aspects, features and advantages of the devices and/or processes and/or other subject matter described herein will become apparent in the teachings set forth herein.

BRIEF DESCRIPTION OF THE FIGURES

FIG. 14 is a flow chart illustrating a process for physically associating an electronic tag with at least one plant, according to an embodiment.

FIG. 15 is a flow chart illustrating a process for receiving at least one plant with an associated electronic tag and interrogating the electronic tag to receive information corresponding to the at least one plant, according to an embodiment.

DETAILED DESCRIPTION

Figure 1:
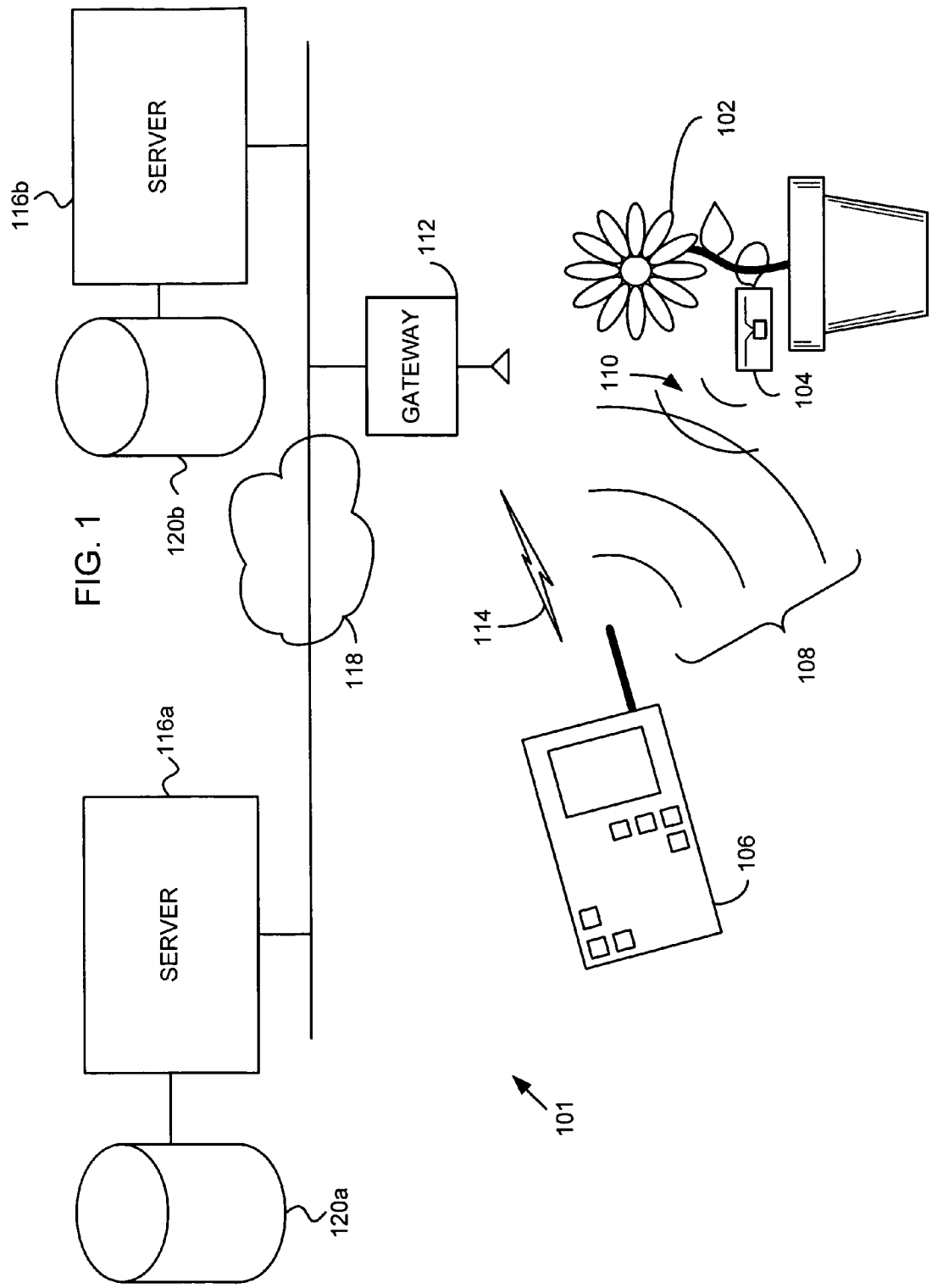
FIG. 1 is an illustrative diagram of a system configured to interface to one or more populations of electronic tags and for performing methods described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 is an illustrative diagram of a system 101 for interfacing to one or more electronic tags 104 coupled to one or more plants 102 according to an embodiment. An electronic tag interrogator 106 may interrogate the electronic tag 104 to receive identification data corresponding to the at least one plant 102. For example, the electronic tag interrogator 106 may include a radio frequency identification (RFID) interrogator that is configured to emit an interrogation field 108 including a radio frequency signal to illuminate one or more radio frequency tags (RF tags) 104. The interrogation field or interrogation signal 108 may be modulated with an appropriate pattern for evoking a response 110 from the RF tag 104. According to some embodiments, the electronic tag interrogator may be in the form of a hand-held and/or portable apparatus that may optionally be in communication with a remote device 112 via a communication signal 114. For example, the remote device 112 may include a gateway, host computer, etc. configured to communicate with the electronic tag interrogator 106 via a radio communication signal 114.

According to an embodiment, the remote device 112 may be operatively coupled to a second remote device 116a, such as a server, over a network 118. The second remote device 116a may include a storage apparatus 120a configured to store at least a portion of a database including information corresponding to the identification data from the electronic tag 104 and the associated at least one plant 102. The remote device 112 may be operatively coupled to a third remote device 116b such as a server, over the network 118. The third remote device 116b may also include a storage apparatus 120b configured to store at least a portion of a database including information corresponding to the identification data from the electronic tag 104 and the associated at least one plant 102.

Embodiments of electronic tags may include user-writable memory. The memory contents may be determined by the user. The user may structure data in the memory according to open or closed standards. According to some embodiments, the memory of the electronic tag may include data structured for access by a plurality of trading partners. As will be described additionally below, electronic tags may be configured to remain with at least one plant 102 while the at least one plant 102 proceeds to market.

The electronic tag 104 may, for example, include various types of electronic tags including a radio frequency tag, such as a passive radio frequency tag, an active radio frequency tag, a backscatter radio frequency tag, a half-duplex radio frequency tag, or a full-duplex radio frequency tag, for example; a touch memory device; a proximity card; a smart card; a photonic tag; etc. Accordingly, the interrogation signal 108 and response signal 110 may include corresponding forms such as radio frequency interrogation and response, touch memory interrogation and response, proximity card interrogation and response, smart card interrogation and response, etc.

Additionally, electronic tags may include read-only, read/write, and write-once-read-many-times (WORM) capabilities. In the case of a writable tag technology such as a read/write or WORM, the relationship shown diagrammatically in FIG. 1 may include writing data from the interrogator 106 to the electronic tag 104 via the interrogation signal 108 and response 110. According to an embodiment, the interrogator 106 may write to the electronic tag 104 identification data and/or one or more external data coordinates and/or other data associated with accessing external data related to the at least one plant 102.

While the at least one plant 102 is illustrated as a single plant in a pot, other forms are contemplated such as flats, rows, pallets, bare root, root ball, groupings, arrangements, beddings, portable gardens, etc.

The at least one plant may include at least one seed, cutting, rhizome, bulb, corm, tuber, annual, biennial, cut flower, perennial, grass, creeper, climber, vine, fern, shrub, bush, or tree.

Figure 2:
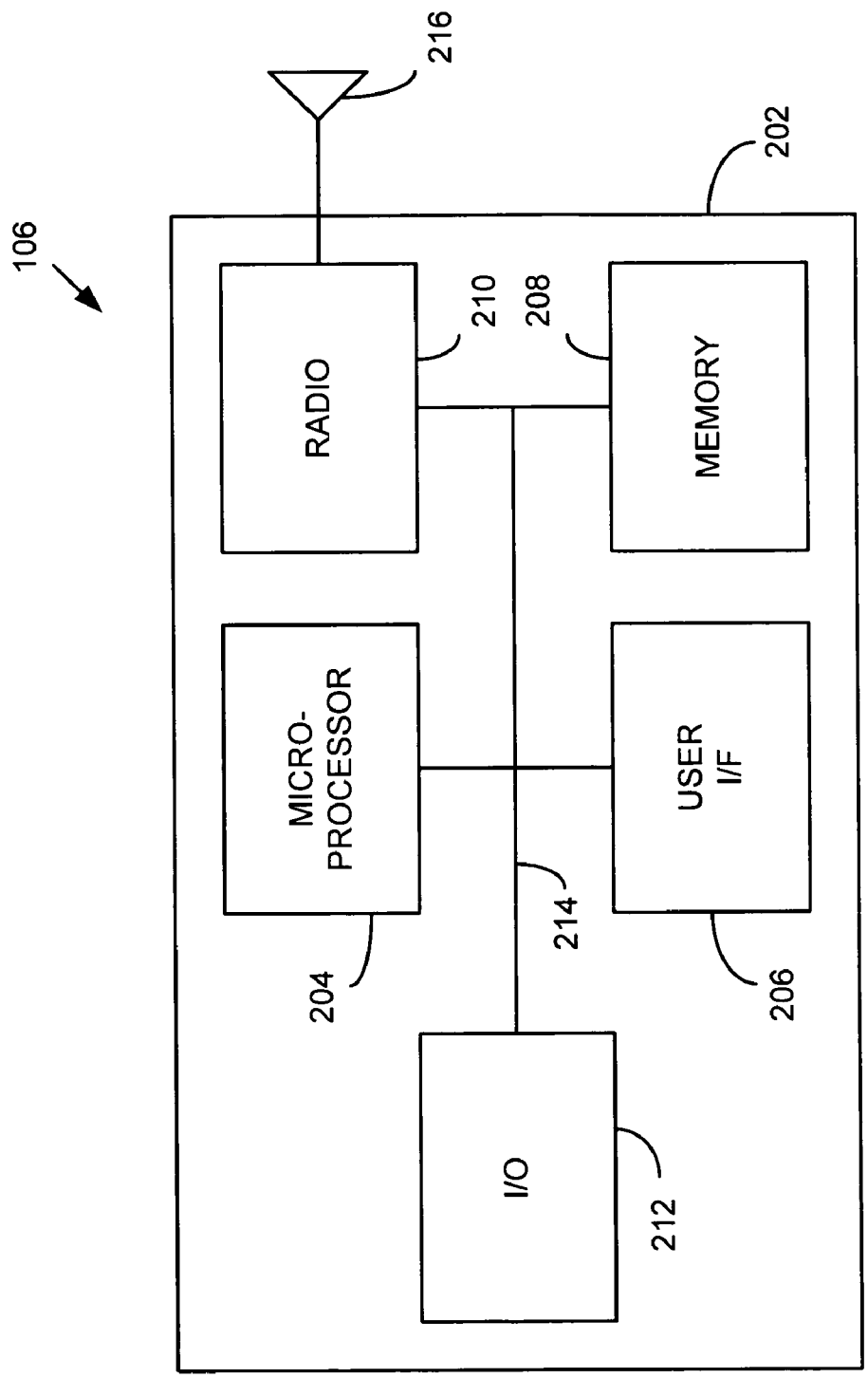
FIG. 2 is a block diagram of an illustrative electronic tag interrogator as depicted in FIG. 1, according to an embodiment.

FIG. 2 is a block diagram of an illustrative electronic tag interrogator 106 as depicted in FIG. 1, according to an embodiment. The electronic tag interrogator 106 may be embodied, for example, as an RF tag interrogator. The interrogator 106 may include a housing 202 substantially enclosing a microprocessor 204, user interface 206, memory circuitry 208, a radio configured to interrogate one or more types of RF tags, and an interface 212 operatively connected by one or more data buses 214. The radio 210 may include one or more antennas 216 operable to illuminate one or more RF tags with an interrogation field and receive a response signal from the one or more RF tags. The interface 212 may itself include a radio configured for communication with a host computer or computer network.

The interrogator 106 may be operable to run a computer program such as a data parsing program configured to parse data pertaining to one or more plants from one or more RF tags, and determine one or more external data coordinates corresponding to a database holding information corresponding to the data. Additionally or alternatively, the interrogator 106 may be operable to transmit received data over the interface 212 to a remote processing resource 112, 116a, 116b and receive information corresponding to the at least one plant (not shown) from the remote processing resource.

According to an illustrative embodiment, the RF tag interrogator 106 may receive a command such as a trigger pull through the user interface 206, interrogate an RF tag associated with at least one plant (not shown) with the radio 210 and at least one antenna 216 to receive data corresponding to the at least one plant, temporarily write received data to workspace in the memory circuitry 208, and execute a program from memory circuitry 208 with the microprocessor 204 to determine a location of an external resource for performing a query of or writing data to an external database.

Referring back to FIG. 1, one or more external resources or servers 120a, 120b may provide logical linkages between electronic tags 104, databases for storing data corresponding to the at least one population of at least one plants, tag population query nodes or other functions. The two or more external resources 120a, 120b may each include a portion of information related to the at least one plant. Alternatively, the two or more external resources 120a, 120b may represent a plurality of potential resources for storing or retrieving data related to the at least one plant, supporting networked query functions, and provide other resources related to reading, writing, and tracking.

Each external resource 120a, 120b that includes data disposed therein related to at least one plant includes the data also disposed on the database for identifying a portion of the database corresponding to the at least one plant.

The electronic tag interrogator 106 may include a computer program configured to store additional data corresponding to a record of additional treatments provided to the at least one plant upon such treatment application. The electronic tag interrogator 106 may include a computer program configured to retrieve from the database at least a portion of the data corresponding to the care of the at least one plant and determine whether a treatment is scheduled to be provided to the at least one plant. The electronic tag interrogator 106 may provide an indication to administer the treatment to the at least one plant if the treatment is scheduled. Upon receiving acknowledgement of the treatment being provided, the electronic tag interrogator 106 may then store in the database data corresponding to a record of providing the treatment.

The electronic tag interrogator 106 may further store location data in an industry accessible registry, the location data corresponding to an address for accessing the database. For example, server 120a may be a resource that provides the database for storing treatment information for plants, and server 120b may be a resource that provides a database for storing one or more locations of server(s) 120a, where multiple instances of servers 120a are accessible for query and/or writing.

Referring to FIG. 1, a software program running on server 120a may associate in a database 116a data corresponding to the care of at least one plant 102 with data identifying the at least one plant 102. The data identifying the at least one plant 102 may be retained in an electronic identification tag 104 associated with each at least one plant 102. The data corresponding to the care of the at least one plant 102 may include plant care instructions or a record of at least one plant care treatment provided to the at least one plant 102.

For embodiments where the electronic tag 104 is writable, the electronic tag interrogator 106 may write to the electronic identification tag 104 a location corresponding to the database 116a where related data is disposed. Additionally or alternatively, the external resource 120a, the electronic tag interrogator 106, or another computing resource may transmit to a second resource 120b at least a portion of the data identifying the at least one plant and data corresponding to the location of the first database 116b for storage on the second database 116b. The data corresponding to the location of the first database 116a may be an accessible address such as an IP address or a URL from which the data corresponding to the care of the at least one plant may be retrieved.

Other embodiments may include additional or reduced functionality in the interrogator 106, may rely on increased or reduced functionality in an external resource, may be operated by a user or operate automatically, may be interfaced to a treatment device to detect treatments, and/or may rely on alternative interrogation technologies. The interface 212 may include a wired interface and/or an intermittent interface such as a memory stick, USB drive, or other detachable memory.

Figure 3:
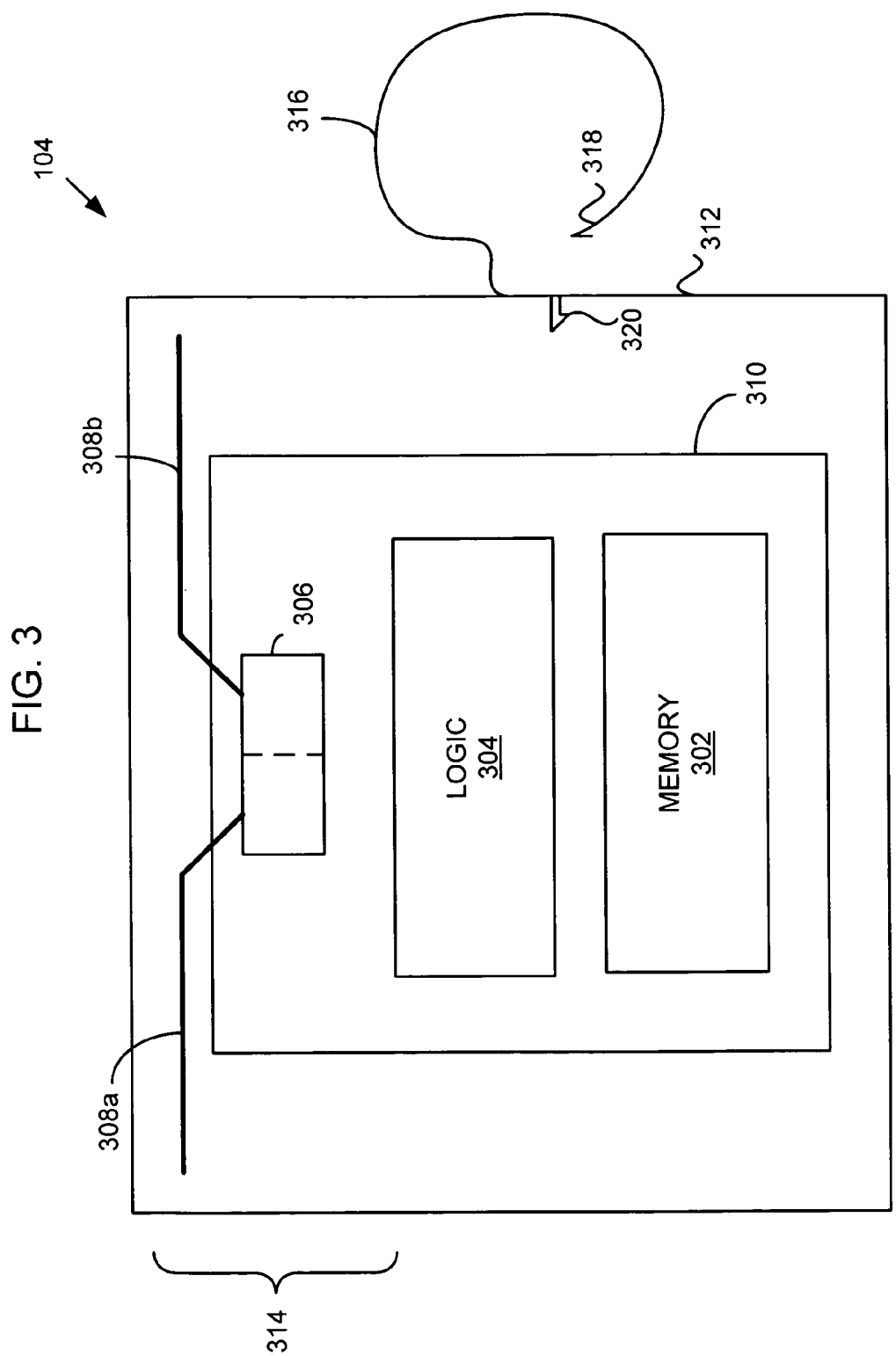
FIG. 3 is a block diagram of an illustrative electronic tag as depicted in FIG. 1, according to an embodiment.

FIG. 3 is a block diagram of an illustrative electronic tag 104 as depicted in FIG. 1, according to an embodiment wherein the electronic tag is in the form of a radio frequency (RF) tag. The RF tag 104 includes a memory circuit 302 (which may be read/write, WORM, or read-only, for example) and a logic circuit 304 operatively coupled to the memory circuit 302. A radio frequency transceiver 306 is operatively coupled to the logic circuit 304. The radio frequency transceiver may be further coupled to an antenna 308a, 308b which may include two respective antenna segments 308a and 308b. The radio frequency transceiver 306 may be configured to provide a switched connection between the antenna segments 308a and 308b. According to an embodiment, the memory circuit 302, logic circuit 304, and transceiver 306 may be formed on a die 310 as an integrated circuit. The integrated circuit 310 and the antenna 308a, 308b may be disposed in a package 312 that may include a printed circuit, for example.

The antenna 308a, 308b, transceiver 306, and optionally at least a portion of the logic circuit 304 may provide an interrogation interface 314 configured to communicate with an external interrogator (not shown). According to an embodiment, the transceiver 306 may hold the antenna portions 308a and 308b in substantial continuity during a first portion of a communication session. During the first portion of the communication session, an interrogation signal (not shown) in the form of radio frequency illumination may be received by the antenna 308a, 308b. In the case of a passive electronic tag 104, the radio frequency illumination may provide an AC voltage that is rectified by a portion of the transceiver 306 and used to charge one or more capacitors (not shown) that in turn provide DC power rails to operate the transceiver 306, logic 304, and memory 302. When the interrogation signal is received, the capacitor(s) charge and the transceiver 306, logic 304, and optionally the memory 302 may be powered up. According to some embodiments, it may be advantageous to power up only portions of the electronic tag 104 as the portions are needed.

Various messages may be encoded on the interrogation field. For example, one message may request tag ID, such as a segment of data by which the unique identity of the electronic tag 104 may be identified. Another message may specify a tag ID and request a portion or more of data held in the memory 302 of the particular electronic tag associated with the tag ID. According to one embodiment, the electronic tag 104 may respond to a data request in half-duplex as a backscatter signal.

For example, the electronic tag 104 may receive a request for at least a portion of data from the memory 302 over a modulated interrogation field (not shown) during a first portion of the communication session. The interrogator (not shown) may then cease to modulate the interrogation signal but maintain illumination of the signal onto the antenna 308a, 308b. The logic circuit 304 (powered by the illumination provided by the interrogation signal) then fetches the requested portion of data from the memory 302 and outputs the data to the transceiver 306. The transceiver 306 selectively couples and uncouples the portions of the antenna 308a, 308b in a pattern corresponding to the data received from the logic 304. The selective coupling and uncoupling of the antenna portions 308a, 308b creates a corresponding variation in reflectivity to the radio frequency illumination provided by the antenna. The variation in reflection may then be detected by the interrogator (not shown) and converted into data corresponding to the data fetched from memory 302.

Of course, substantial handshaking, error correction, and other interactions between the interrogation signal (not shown) and the response signal (not shown) may be used to improve communication reliability, extend range, and/or provide other capabilities.

Similarly, data may be written from an interrogator (not shown) to the memory 302 of an electronic tag 104 using a similar approach. Data that may be written to and/or read from the memory 302 an electronic tag 104 may include a range of contents. For example, the data may include an identifier corresponding to the at least one plant and/or one or more data coordinates referencing external data locations corresponding to the at least one plant.

According to an embodiment, the package 312 may include encapsulation or other form of protection for the circuitry and/or antenna. The package 312 may include a coupling 316 configured to couple to at least one plant to attachment to a plant (not shown). In the example of FIGS. 1 and 3, the coupling 316 may include a loop such as a "zip tie" or lanyard that provides a permanent or semi-permanent association with a plant or a group of plants. According to an embodiment, the coupling 316 may be formed integrally with the package 312 for convenient attachment to one or more plants.

The coupling 316 may be embodied as a lanyard 316 having a coupling tip 318. The coupling tip 318 may be configured to insert into and be retained by a corresponding coupling socket 320 formed in the electronic tag package 312 to effectively form an attachment to the at least one plant 102.

Figure 4:
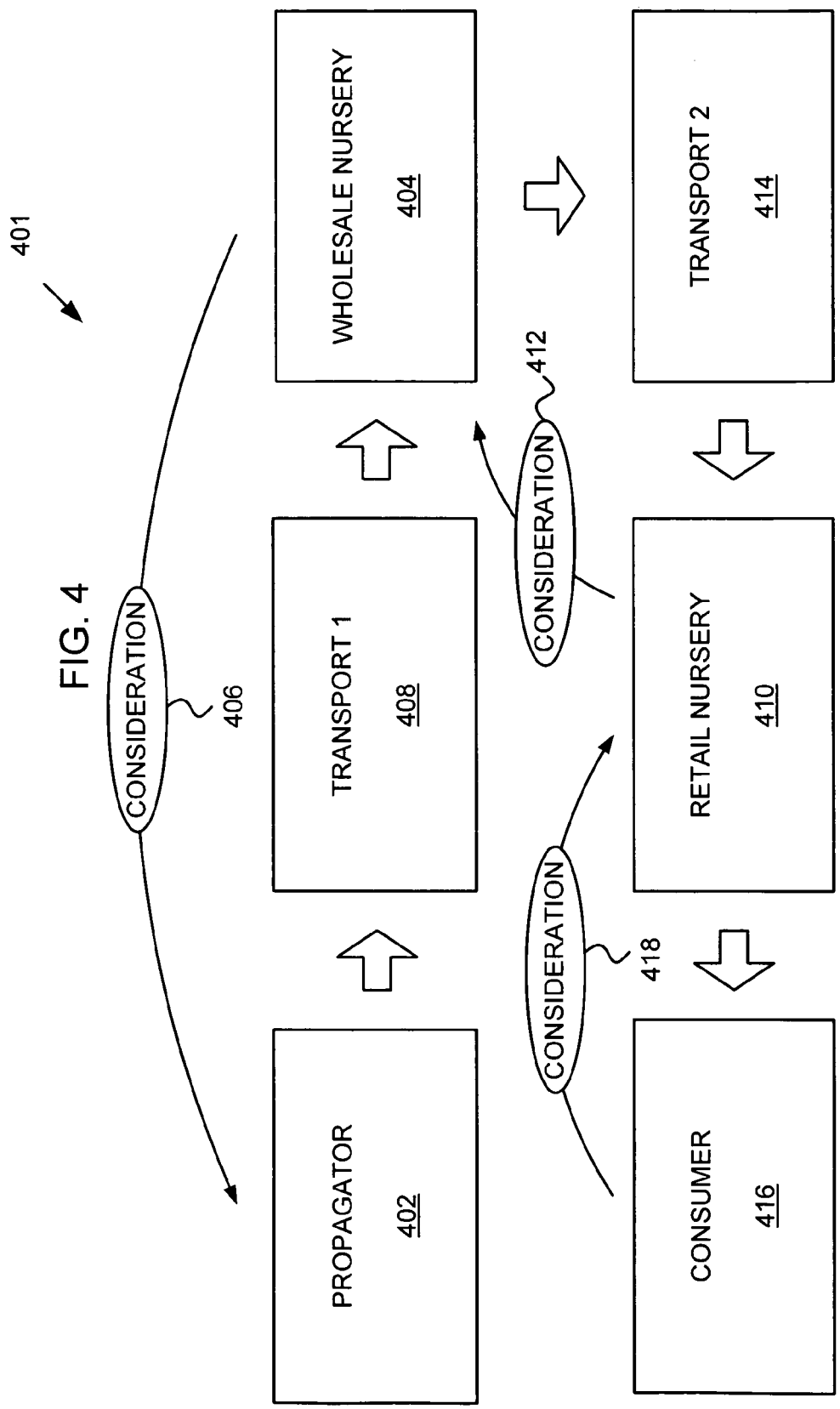
FIG. 4 is a simplified depiction of a supply chain for plants, according to an embodiment.

FIG. 4 is a simplified depiction of a supply chain 401 for plants, according to an embodiment. In the supply chain 401, at least one plant with a physically associated electronic tag may be transferred between trading partners. For example one or more plant propagators 402 may optionally transfer plants or plant materials between one another. The one or more plant propagators 402 may physically associate an electronic tag with at least one plant. The electronic tag may be interrogated at the propagator's 402 premises to write data to the electronic tag and/or receive data from the electronic tag. The data itself, or alternatively an external database accessed by the data, may then provide information regarding the at least one plant. Such information may include simple identification information. Alternatively, the information may include a record of treatments received by the at least one plant, instructions regarding treatments for the at least one plant, variety or hybrid information, or other information related to the at least one plant A wholesale nursery 404 may provide consideration 406 to the one or more plant propagators 402 to purchase the at least one plant. The propagator may physically transfer the at least one plant with physically associated electronic tag via a first transporter 408 to the wholesale nursery 404. If the at least one plant includes a physically associated electronic tag at the propagator 402, then the first transporter 408 and/or the wholesale nursery 404 may interrogate the electronic tag to receive or record information related to the at least one plant.

Alternatively, if the propagator 402 had not physically associated an electronic tag with the at least one plant, the wholesale nursery 404 may physically associate an electronic tag with the at least one plant. The wholesale nursery 404 may interrogate the electronic tag to record information related to the identity of the propagator 402, a date received, or other information known at the time of receipt of the at least one plant.

The wholesale nursery 404 may interrogate the electronic tag to write and/or read data to respectively provide and/or receive information related to the at least one plant. For example, the wholesale nursery 404 may record the application of treatments to the at least one plant in the memory of the electronic tag, or alternatively in an external database corresponding to the electronic tag.

A second nursery 410, such as a retail nursery, may later provide consideration 412 to the wholesale nursery 404 to purchase the at least one plant. The wholesale nursery 404 may transport the at least one plant to the retail nursery 410 via a second transporter 414. A consumer 416, which may alternatively include a provider of plants to commercial establishments, may then provide consideration 418 to the retail nursery 410 to purchase the at least one plant with physically associated electronic tag.

The trading partners 402, 404, 408, 410, 414, 416 depicted as a group 401 in FIG. 4 may vary considerably. For example at least two trading partners include a first farm, a second farm, a first propagator, a second propagator, a first nursery, a second nursery, a first wholesaler, a second wholesaler, a first transporter, a second transporter, a first warehouse, a second warehouse, a first retailer, and a second retailer and a consumer and/or other trading partners appropriate for bringing the at least one plant to market. But, according to an embodiment, at least one plant transferred between at least two trading partners includes a physically associated electronic tag that includes data corresponding to the at least one plant.

The trading partners 401 may include a second organization that purchases the at least one plant from a first organization. According to embodiments, the purchase may include payment 406, 412, 418 of money and/or electronic funds representative of money. Alternatively, the purchase may include consideration 406, 412, 418 other than money.

While the at least one plant makes its way through the supply chain 401, the electronic tag physically associated with the at least one plant may include a package configured to provide interrogation access during retention by at least two trading partners 402, 404, 410, 416. The electronic tag may also be configured to provide interrogation access, such as by the first transporter 408 or the second transporter 414, during at least one physical transfer between trading partners 402, 404, 410, 416. The electronic tag may include a package configured for association with the at least one plant during a period spanning a purchase by the end customer 416.

One approach for providing an electronic tag that maintains physical association with at least one plant during transfers between trading partners 402, 404, 411 and transporters 408, 414 in a supply chain 401, is to provide a package that is configured for self-contained physical association with at least one plant. Being configured for self-contained physical association generally refers to not requiring an external coupling to make the association. For example, referring to the electronic tag embodiment 104 shown in FIG. 3, an integrated tie 316 may be looped around one or more stems of at least one plant, thus eliminating the need for an external coupling apparatus such as a separate string, separate zip tie, separate rubber band, separate twist tie, etc. Rather, the string, zip tie, rubber band, twist tie, etc. may be provided already coupled to the electronic tag package 312. This may aid in convenience to a user by avoiding the need to carry separate coupling apparatuses into a field or nursery for attaching to the plants.

An electronic tag 104 and its self-contained physical association with at least one plant 102 may include a variety of approaches according to embodiments.

While certain embodiments may not precisely correspond with a given approach and/or may correspond with more than one approach, a range of approaches for physically associating an electronic tag with at least one plant are diagrammatically described in FIGS. 5-8.

Figure 5:
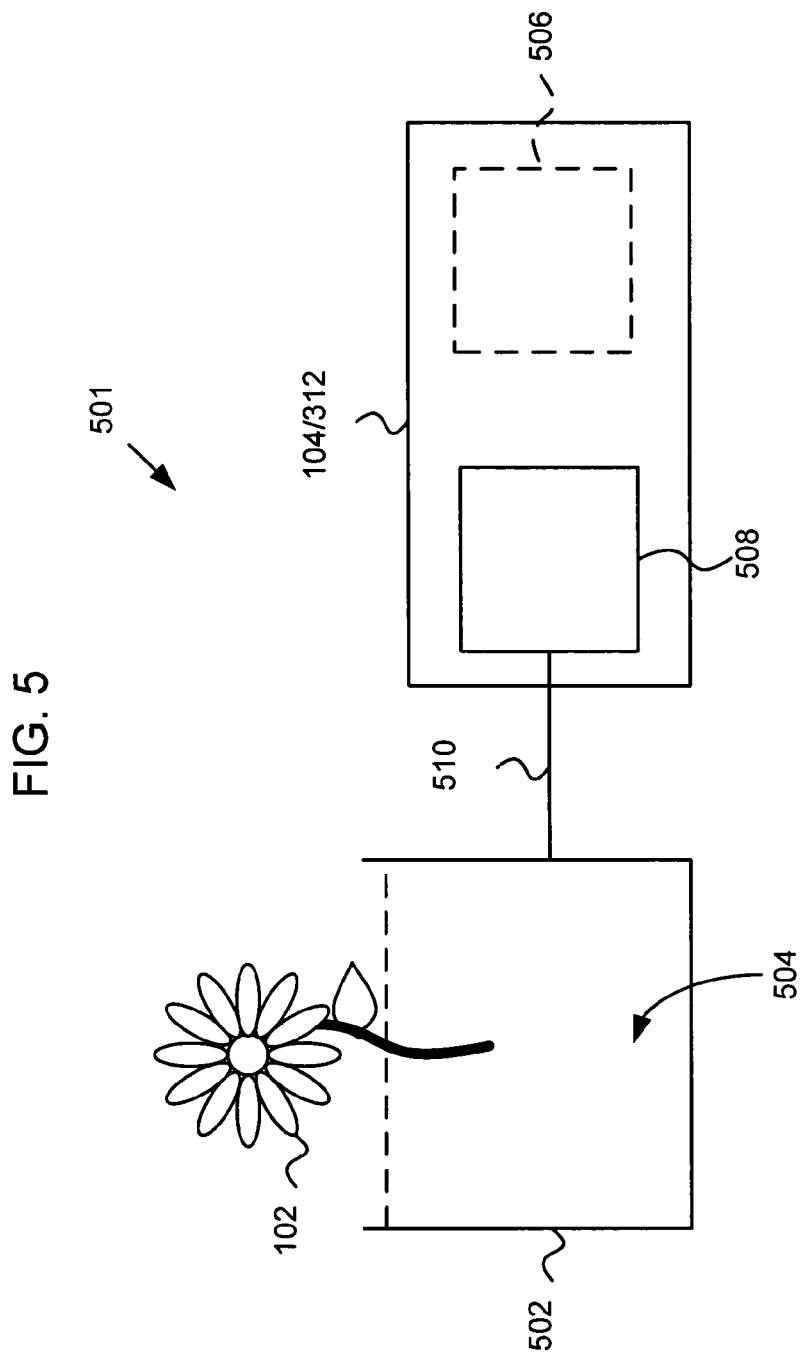
FIG. 5 is a simplified depiction of an approach for associating an electronic tag with at least one plant, wherein the electronic tag is configured for coupling to a plant container, according to an embodiment.

FIG. 5 is a simplified depiction of an approach 501 for associating an electronic tag 104 with at least one plant 102, wherein the electronic tag is configured for self-contained coupling to a plant container 502, according to an embodiment.

For example, the plant container 502 may include a plant pot, a decorative pot, a hanging pot, a fiber pot, a peat pot, a coir pot, a plant tray, a seed flat, a starter tray, a plug tray, a propagation tray, a hydroponics container, a seed package, a bare root bag, a root ball wrap, burlap fabric, or a seed mat. The plant container 502 may contain substantially the entire at least one plant 102. Alternatively, the plant container 502 may contain a portion of the at least one plant 102, such as the plant's roots embedded in a potting mixture 504.

The electronic tag 104 may include a package 312 that carries electronic tag circuitry 506 and an integral coupling apparatus 508 configured to provide a physical attachment 510 to the plant container 502. For example, the coupling apparatus 508 may include an integral tie, an attached elastic band, a staple, an attached string, integrated zip tie, integrated rubber band, or integrated twist tie configured to establish the physical attachment 510 to the container 502 for the at least one plant 102. Other integral coupling apparatuses 508 may be substituted according to alternative embodiments.

Figure 6:
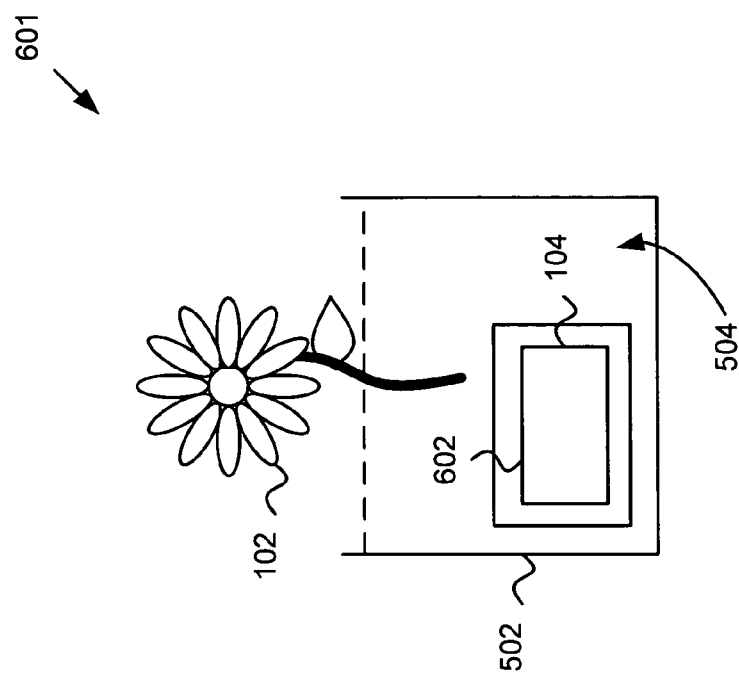
FIG. 6 is a simplified depiction of another approach for associating an electronic tag with at least one plant, wherein the electronic tag is configured for embedding in a plant container, according to an embodiment.

FIG. 6 is a simplified depiction of another approach 601 for self-contained association of an electronic tag 104 with at least one plant 102, according to an embodiment. In approach 601, the electronic tag 104 is configured for embedding in a plant container 502.

For example, the plant container 502 may include a plant pot, a decorative pot, a hanging pot, a fiber pot, a peat pot, a coir pot, a plant tray, a seed flat, a starter tray, a plug tray, a propagation tray, a hydroponics container, a seed package, a bare root bag, a root ball wrap, burlap fabric, or a seed mat. The plant container 502 may contain substantially the entire at least one plant 102. Alternatively, the plant container 502 may contain a portion of the at least one plant 102, such as the at least one plant's roots embedded in a potting mixture 504.

The electronic tag 104 may include a package 602 configured for embedding in the plant container 502. For example, the package 602 may be constructed as a capsule to be substantially impervious to plant soil, non-soil potting mix, a soil amendment, a rooting medium, fertilizer, plant chemicals, or a hydroponics solution. The package 602 carrying the electronic tag may then be embedded or submerged in the plant soil, non-soil potting mix, a soil amendment, a rooting medium, fertilizer, plant chemicals, or hydroponics solution carried by the plant container 502.

The package 602 (whether configured for physical association with at least one plant in a manner depicted in FIG. 6, or by another manner) may be configured to protect the electronic tag 104 from plant environments that might otherwise damage the electronic tag 104. For example, the package may be configured to protect the electronic tag 104 from sunlight, moisture, water, heat, cold, shock, vibration, pH variation, herbicide, and fertilizer.

The electronic tag 104 may include a package 602 configured to be at least partially embedded within a medium 504 such as plant soil, non-soil potting mix, a soil amendment, a rooting medium, fertilizer, plant chemicals, or a hydroponics solution carried by the container 502. For example, the electronic tag package 602 may be configured as a plant stake, a plant label, a plant marker, or a plant variety tag that is partially embedded in the medium 504 and that also serves a second purpose of supporting or providing human-readable identification for the at least one plant 102.

Accordingly the package 602 may further include printed indicia corresponding to the at least one plant. The printed indicia may include a species name, a cross name, plant care instructions, a database location, an image of at least one mature plant, and/or an image of a bloom corresponding to the at least one plant.

Alternatively, the electronic tag 104 may be embedded within the plant container 502. According to embodiments, the electronic tag 104 may be molded into or substantially permanently affixed to a plant pot, a decorative pot, a hanging pot, a fiber pot, a peat pot, a coir pot, a plant tray, a seed flat, a starter tray, a plug tray, a propagation tray, or a hydroponics container. According to other embodiments, the electronic tag 104 may be substantially permanently affixed to a seed package or a bare root bag, or woven into a root ball wrap, burlap fabric, or a seed mat. In some embodiments, the package 602 may include the plant container 502, such as when an electronic tag die 310, shown and described in FIG. 3, is molded or pressure formed into the plant container 502. In other embodiments, the package 602 may be configured as a flexible die cut substrate for folding and forming a seed package, bulb package, rhizome package, corm package, or other packaging for carrying at least one plant. In other embodiments, the package 602 may include a woven or non-woven fabric or needle penetrable substrate for weaving or sewing into a woven or non-woven plant container 502, for example a plant container embodied as burlap for wrapping a root ball, a seed mat, or a bare root bag.

Figure 7:
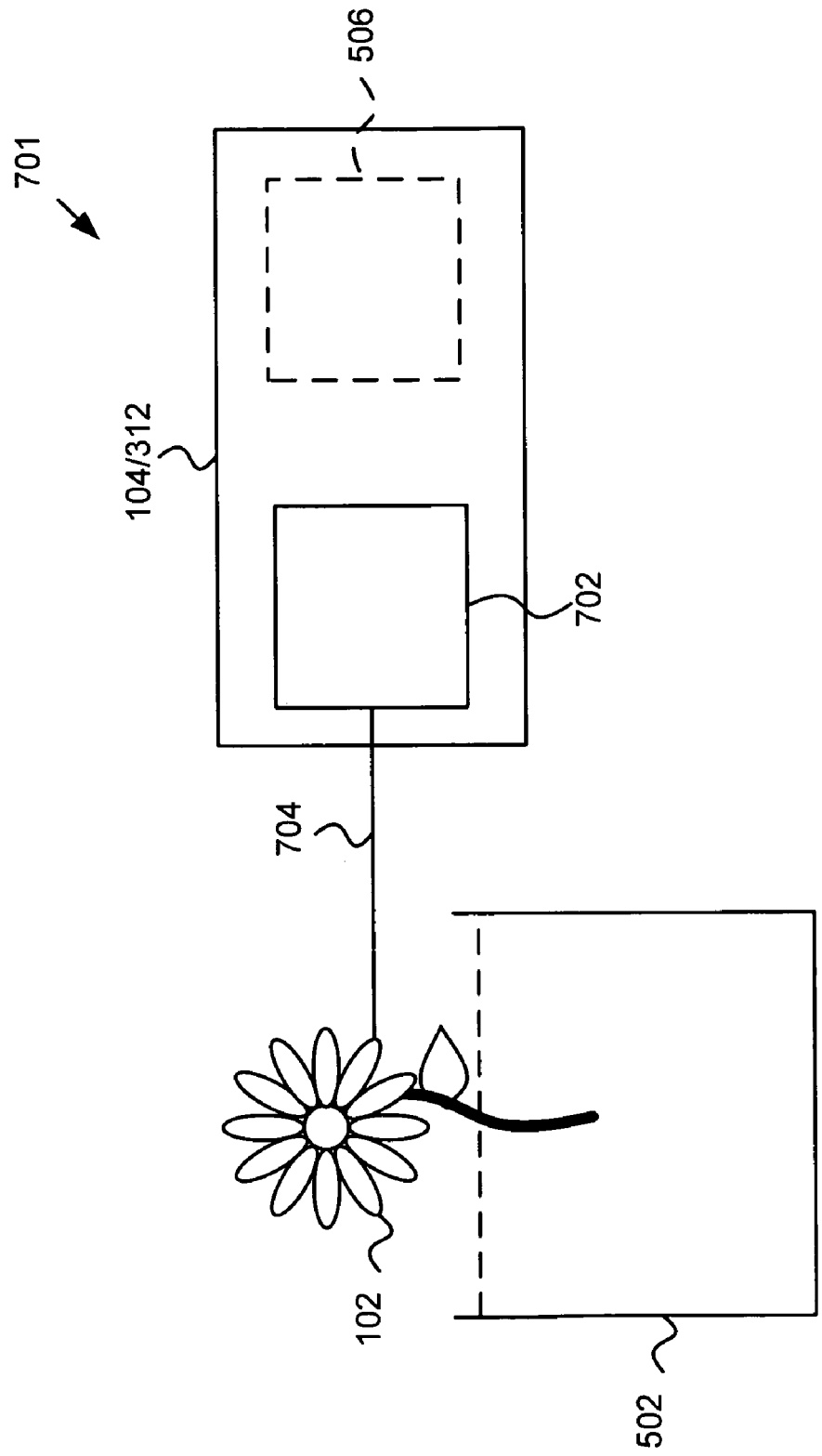
FIG. 7 is a simplified depiction of another approach for associating an electronic tag with at least one plant, wherein the electronic tag is configured for coupling to the at least one plant, according to an embodiment.

FIG. 7 is a simplified depiction of another approach 701 for physically associating an electronic tag 104 with at least one plant 102, wherein the electronic tag 104 is configured for self-contained coupling to the at least one plant 102, according to an embodiment. In embodiments corresponding to the approach 701, the at least one plant 102 may or may not include a plant container 502.

The electronic tag 104 may include a package 312 that carries electronic tag circuitry 506 and an integral coupling apparatus 702 configured to provide a physical attachment 704 to the at least one plant 102. For example, the coupling apparatus 702 may include an integral tie, an attached elastic band, a staple, an attached string, integrated zip tie, integrated rubber band, or integrated twist tie configured to establish the physical attachment 704 to the at least one plant 102. Other integral coupling apparatuses 508 may be substituted according to alternative embodiments.

For example, the coupling apparatus 702 may be configured to couple to the at least one plant 102 by looping a physical attachment 704 around the at least one plant stem, trunk, branch or vine. The coupling apparatus 702 may alternatively be configured to couple to the at least one plant 102 by embedding a physical attachment 704 including a prong or a staple into or through a portion or representative sampling of the at least one plant 102.

Figure 8:
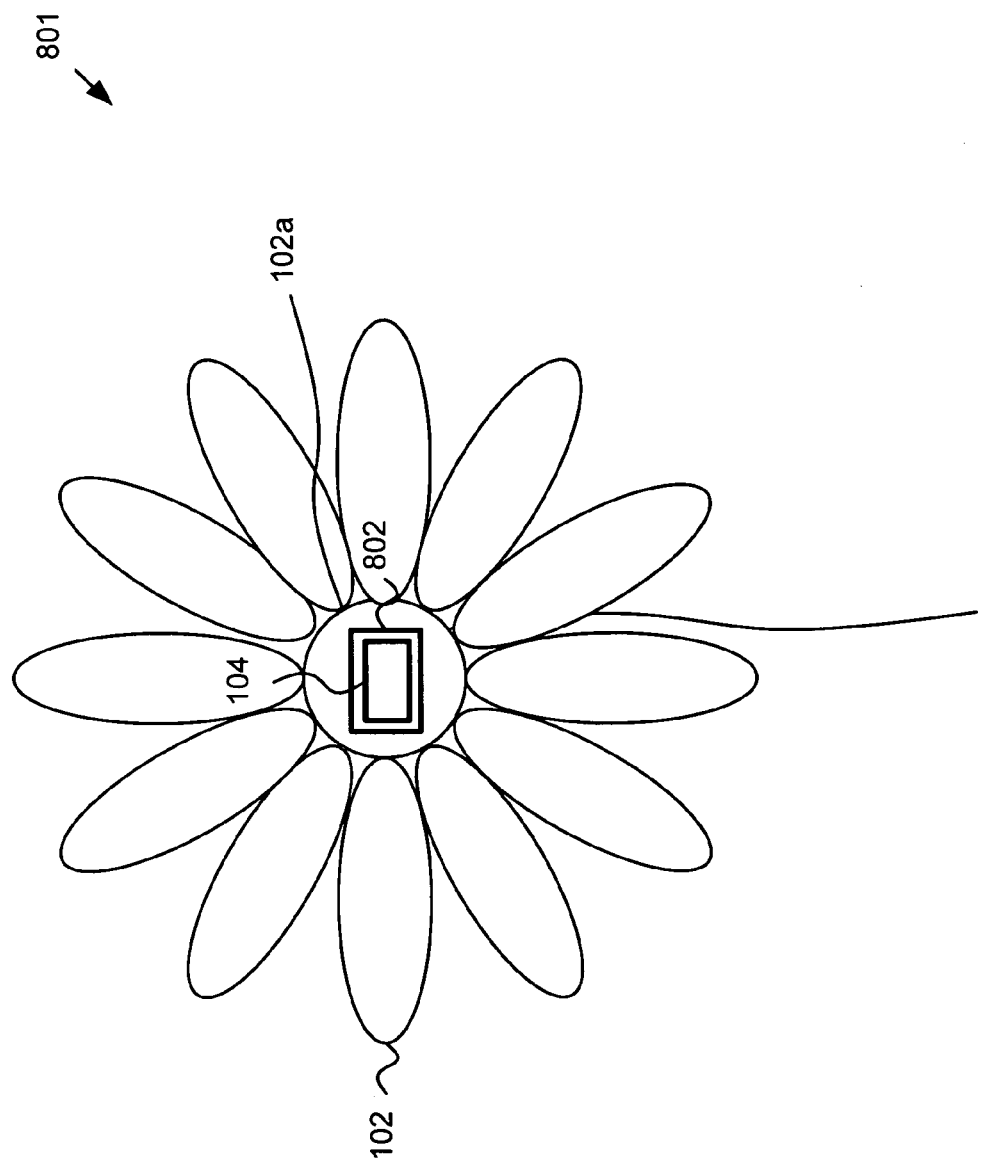
FIG. 8 is a simplified depiction of another approach for associating an electronic tag with at least one plant, wherein the electronic tag is configured for embedding in a plant, according to an embodiment.

FIG. 8 is a simplified depiction of another approach 801 for associating an electronic tag 104 with at least one plant 102, wherein the electronic tag 104 is configured for embedding in the plant 102, according to an embodiment.

At least one plant 102 may include a portion 102a amenable to physically embedding or implanting an electronic tag 104. For example, a woody stock, trunk, stem, vascular tissue, root, primary root, tuber, corm, rhizome, seed head, bud, fruit, or leaf may have a physical extent and anatomy adapted to receive an implanted electronic tag 104.

Preferably, a plant portion 102a selected for physical implantation of an electronic tag 104 is resistant to deleterious effects attributable to the electronic tag 104 and/or the electronic tag package 802. For example, it may be disadvantageous to implant an electronic tag 104 in a bud that would normally mature into a flower providing a primary value delivered by the at least one plant 102, if the implanted electronic tag 104 were associated with a pathology, shape, or other aberration that may typically reduce the value of the flower. On the other hand, implanting a tag in a representative sample of many buds may be advantageous if the representative sample remains physically associated with a "payload" of non-implanted and non-damaged buds. In many embodiments, it may be advantageous to select a plant portion for implantation 102a that does not result in a decrease or perceived decrease in plant value.

The package 802 of the electronic tag 104 may be provided with a functionality selected for compatibility with the at least one plant 102 generally and with the at least one plant portion 102a in particular. According to an embodiment, the package 802 may include a moisture-absorbing open cell foam configured to provide a more constant water supply to the at least one plant 102. According to another embodiment, the package 802 may include a mesh or fertilizer-coated mesh configured to become enmeshed with fibrous roots, thereby becoming substantially implanted or embedded by virtue of its relative non-separability from the plant tissue. According to another embodiment, the package 802 may be provided in an injectable form suitable for needle insertion. An injectable or other embeddable package 802 may include a surface chemistry selected for bio-compatibility. An embeddable package 802 may include a bio-degradable, compostable, sawable, or other characteristic configured to reduce or eliminate a need to separate the electronic tag 104 from the at least one plant 102, either during passage through the supply chain 401 (FIG. 4) or during further processing, consumption, service life, or recycling.

Figure 9:
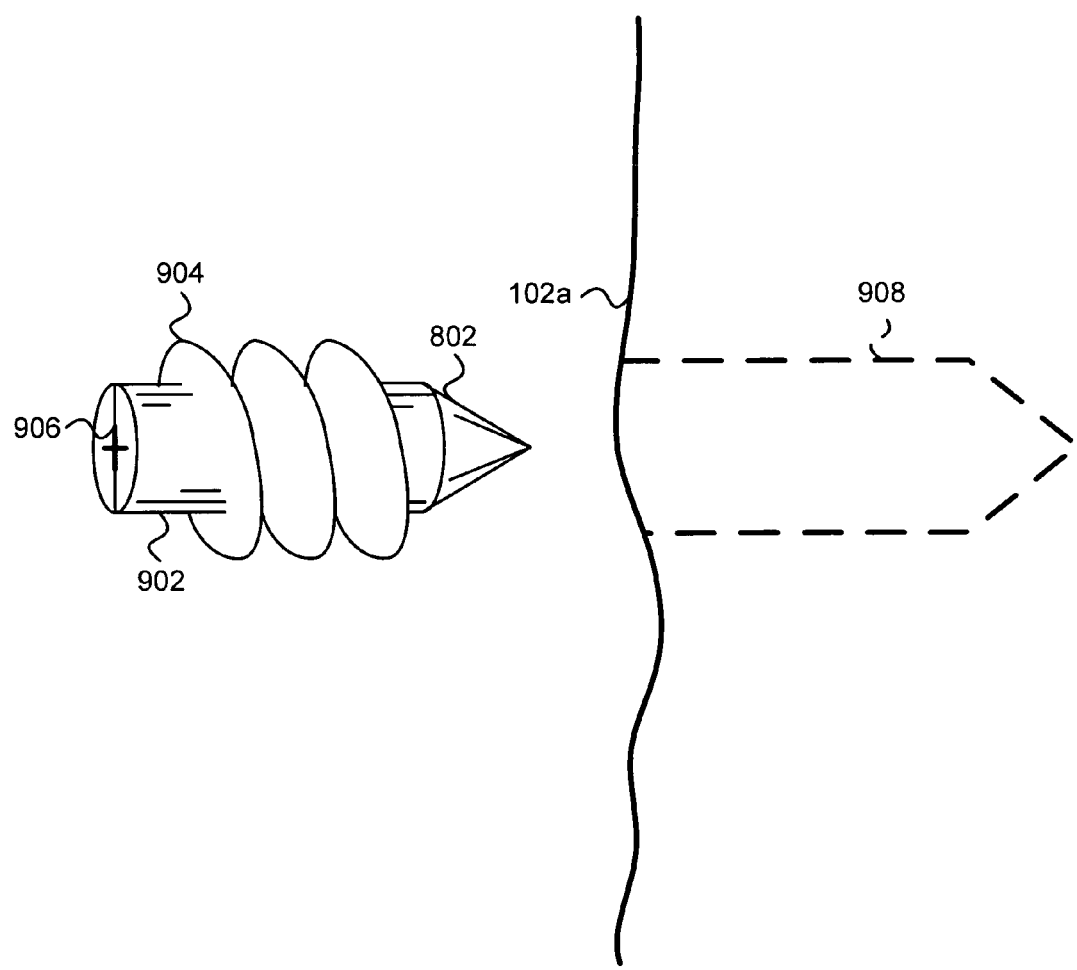
FIG. 9 is a simplified depiction of an electronic tag configured to be embedded in a plant, according to an embodiment.

FIG. 9 is a simplified depiction 901 of an electronic tag 102 including a package 802 configured to be embedded in a plant portion 102a, according to an embodiment.

The electronic tag package 802 includes a cylindrical body 902 with screw threads 904 formed around its periphery. A head 906 may be formed to receive a standard or specialty driver bit. According to an embodiment, head 906 may include engagement features including a combination of Phillips and slot screwdriver heads in a hex head periphery.

The body 902 and screw threads 904 may be formed from a non-shattering engineering plastic that has an initial hardness sufficient to survive driving into a hole 908 formed in a plant portion 102a, such as a woody trunk. The non-shattering engineering plastic may have a hardness or subsequently develop a hardness low enough to avoid shattering upon impact by a saw blade that may be encountered during processing of the woody trunk 102a into lumber. For example, a package 802 including HDPE or modified HDPE, polystyrene, other types of polymers and polymeric blends, cellulosic materials, frozen materials (e.g. when embedded), or other material may be structured to withstand torque and shear received from a driver and may include a lubricant such as talc, wax, or graphite. The package may subsequently degrade, such as by a moisture-driven de-crosslinking reaction or thawing, or may be shear thinning to avoid splintering upon impact by a saw blade.

The electronic tag 104 (not shown) embedded in the package 802 may include a substrate small enough or with a hardness low enough to avoid transformation into a dangerous projectile responsive to impact from a saw blade. For example, RFID single-chip dies may be single-digit millimeter, sub-millimeter, or smaller in dimension. Upon impact from a saw blade, such a die may be initially imparted with a relatively high velocity, but relatively low kinetic energy owing to its low mass. Such a low kinetic energy moving die may be substantially stopped and washed away by a water shower, air shower, screen, streamers, or other projectile abatement between the saw blade and impact-susceptible surroundings.

Figure 10:
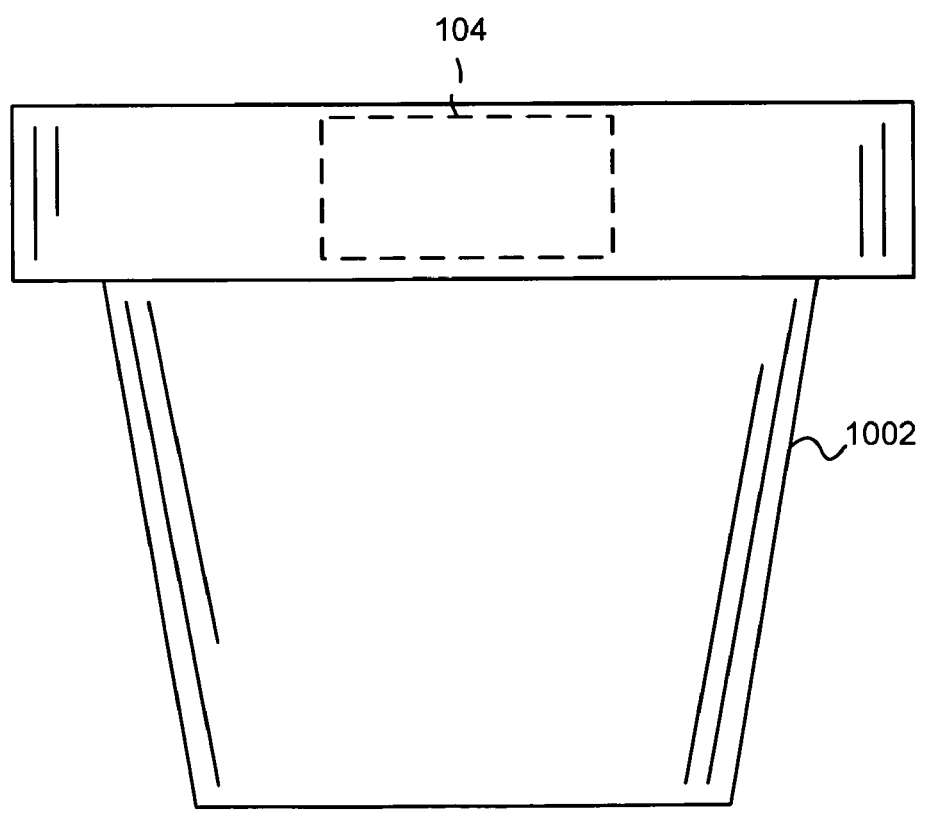
FIG. 10 is a simplified depiction of a plant container including an embedded electronic tag, according to an embodiment.

FIG. 10 is a simplified depiction of a plant container 1002 including an embedded electronic tag 104, according to an embodiment. The plant container 1002 with embedded electronic tag may represent an approach for embedding an electronic tag in a plant container, such as an approach 601 shown in FIG. 6 for example.

According to an embodiment, the electronic tag 104 may be co-molded with a thermoplastic material forming the plant container 1002. According to another embodiment, the electronic tag 104 may be compressed into a compression-formed plant container 1002. Alternatively, the electronic tag 104 may be hand- or machine-inserted into the wall of the formed plant container 502 to provide a plant container 1002 including an embedded electronic tag.

Care should be taken to ensure access to the electronic tag's 104 interrogation interface after embedding in the plant container 1002. For example, radio signals to and from an RF tag 104 may be substantially blocked by a decorative foil wrapping around the plant container 1002. It may be preferable to use a radio-transparent decorative material in place of a metallic foil. Similarly, for other types of electronic tags 104, it may be preferable to use a capacitive interface to a conductive interface if a selected implantation process would result in dielectrically embedding electrical contacts.

Figure 11:
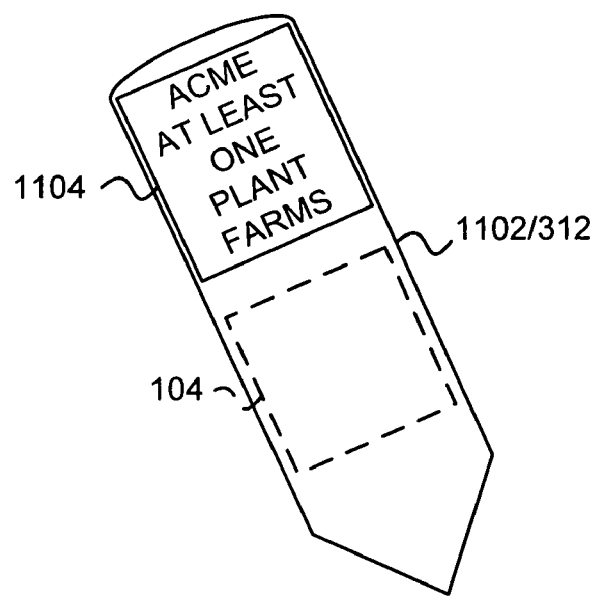
FIG. 11 is a simplified depiction of a plant stake including an embedded electronic tag, according to an embodiment.

FIG. 11 is a simplified depiction of a plant marker stake 1102 including an embedded electronic tag, according to an embodiment. The plant marker stake 1102 with embedded electronic tag may represent an approach for embedding an electronic tag 104 within a plant container, such as another approach 601 shown in FIG. 6 for example.

The plant marker stake 1102 may be formed, for example, from polystyrene, polyvinylchloride, cellulosic, biodegradable, compostable, or other material selected for a combination of service life, low environmental impact, and/or visual appeal. The electronic tag 104 may be adhered, stapled, tethered, or otherwise physically coupled to the body of the plant marker stake 1102. Alternatively, the electronic tag 104 may be co-molded or pressure-formed into the plant marker stake 1102, the plant marker stake thus also providing a package 312 for the electronic tag 104.

The plant marker stake, and/or or package 1102, 312 may further include printed indicia 1104. The printed indicia includes at least one of a species name, a cross name, plant care instructions, a database location, an image of at least one mature plant, or an image of a bloom corresponding to the at least one plant.

Figure 12:
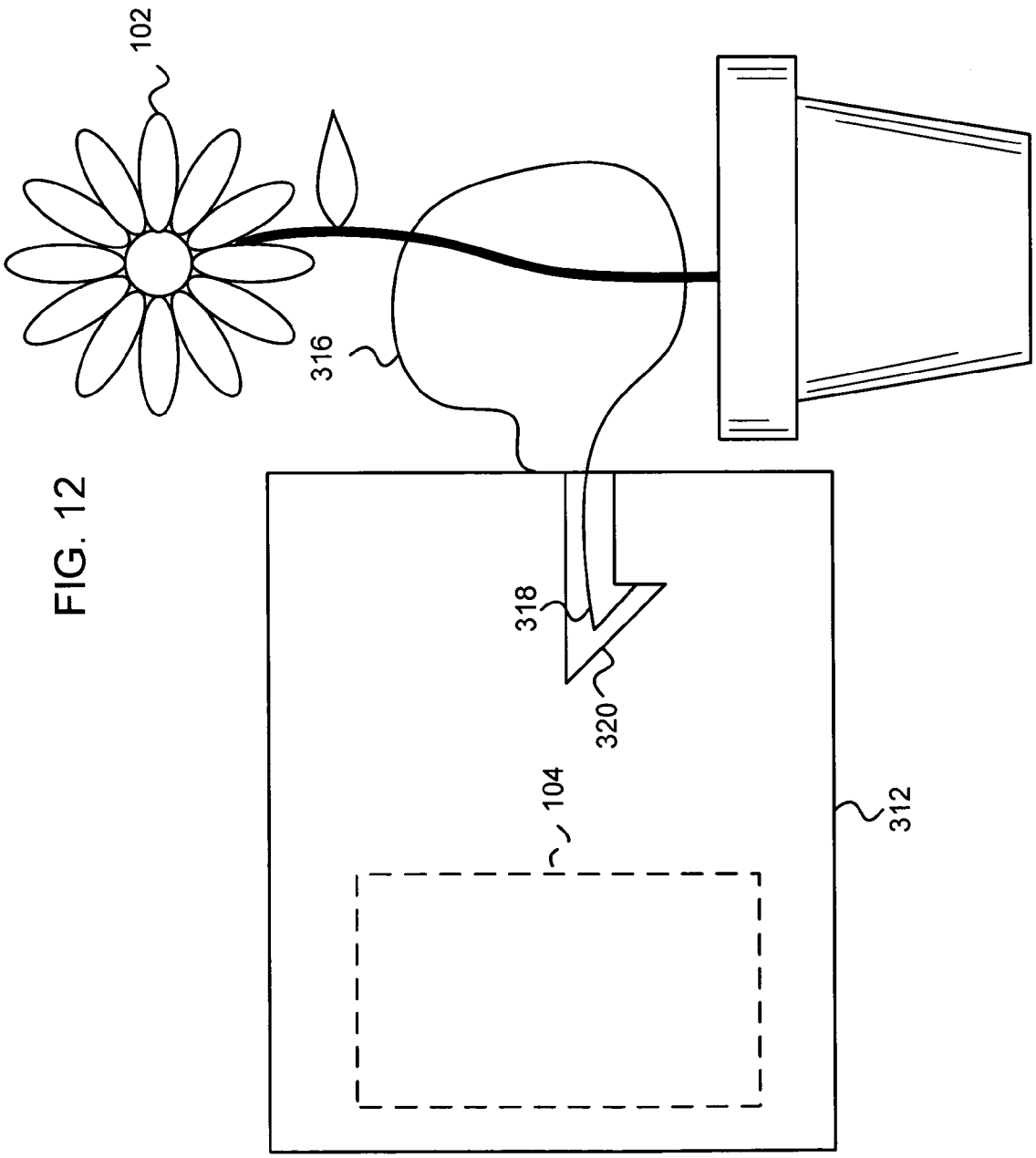
FIG. 12 is a simplified depiction of an electronic tag configured for coupling to at least one plant, according to an embodiment.

FIG. 12 is a simplified depiction 1201 of an electronic tag configured for coupling to at least one plant, according to an embodiment. For example, the electronic tag configured for coupling to at least one plant may represent an approach for coupling an electronic tag to a plant, such as the approach 701 shown in FIG. 7.

A package 312 including an electronic tag 104 may include a lanyard 316 having a coupling tip 318. The coupling tip 318 may be configured to insert into and be retained by a corresponding coupling socket 320 formed in the electronic tag package 312. The lanyard 316 may be formed to loop around a portion of a plant 102. The lanyard 316 may be elastic or otherwise flexible to provide easy and reliable coupling to the at least one plant 102.

Figure 13:
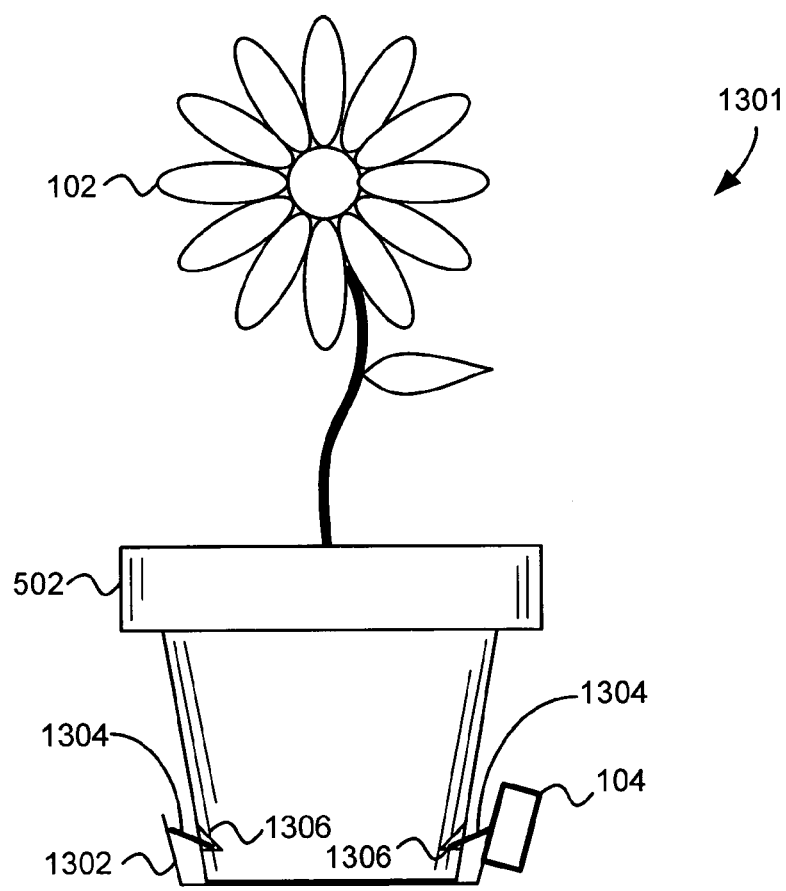
FIG. 13 is a simplified depiction of an electronic tag including a package having an integrated coupling apparatus configured to physically couple to a plant container, according to an embodiment.

FIG. 13 is a simplified depiction 1301 of an electronic tag including a package 1302 having an integrated coupling apparatus 1304 configured to physically couple to a plant container 502, according to an embodiment. The package 1302 is configured as a plant tray. The coupling apparatus 1304 is configured to springably couple to a matching feature 1306 formed in the plant container 502. Alternatively, the matching feature 1306 may be omitted and the coupling apparatus 1304 may maintain coupling by friction or penetration of the plant container 502. According to embodiments, the package 1302 is configured to maintain attachment to the plant container 502 during transfer and transport of the at least one plant 102 between trading partners 402, 404, 410 in the supply chain 401 depicted in FIG. 4. The supply chain 401 may be considered to extend to the consumer 416 and the package 1302 may remain physically coupled to the plant container 502 after transfer to the consumer 416.

FIG. 14 is a flow chart illustrating a process 1401 for physically associating an electronic tag with at least one plant, according to an embodiment. FIG. 14 may relate to one or more procedures performed by one or more trading partners shown in the supply chain 401 of FIG. 4. Embodiments are described below At step 1402, an electronic tag is received. According to an embodiment, it is contemplated that the electronic tag (not shown) may be purchased from an electronic tag manufacturer. According to another embodiment, the electronic tag may be received from another trading partner in the supply chain 401, from an electronic tag packager, from a smart label converter, from a system integrator, from an electronic tag distributor, or from an electronic tag dealer.

At step 1404, at least one plant is received. Strictly speaking, step 1404 may involve propagating the at least one plant rather than receiving the at least one plant from another party. Alternatively, the at least one plant may be received from another party but without a physically associated electronic tag. The order of steps 1402 and 1404 may be interchanged or substantially simultaneous.

For example, the at least one plant may includes at least one of at least one seed, cutting, rhizome, bulb, corm, tuber, annual, biennial, cut flower, perennial, grass, creeper, climber, vine, fern, shrub, bush, and/or tree.

Proceeding to step 1406, the electronic tag is physically associated with at least one plant. Various approaches for providing physical association between an electronic tag and at least one plant are described above. According to some embodiments, the electronic tag may include one or more apparatuses for making self-contained physical association. Physical association may be inherent in another act, such as when an electronic tag is embedded in a supply good, such as a pot, flat, etc. The physical association may be made such that the electronic tag remains physically associated with the at least one plant during subsequent treatments, transfers, and processing.

The process 1408 is then used to track and record information related to the at least one plant. The electronic tag is interrogated during the process 1408. The interrogation may include reading the electronic tag and/or writing data to the electronic tag. The data read from and/or written to the electronic tag may include tag/plant identity information. The data read from and/or written to the electronic tag may further include data corresponding to information about the at least one plant. For example, in a read/write electronic tag, data related to information about when the at least one plant was watered or fertilized may be written to an electronic memory circuit within the electronic tag. Alternatively, the electronic tag may be read to determine the tag/plant identity, and data related to information about the plant may be read from and/or written to an external database corresponding to the identity. The process 1408 may be repeated or modified responsive to care, condition, valuation, or other aspects of maintaining or transferring the at least one plant.

Proceeding to step 1410, the at least one plant and its physically associated electronic tag may be transferred to another trading partner or consumer. Optionally, information related to the at least one plant may also be transferred to the other trading partner or consumer, as shown in step 1412. A separate step 1412 may be appropriate when the electronic tag is a read-only electronic tag or when the electronic tag contains less data than what may correspond to all the information related to the at least one plant generated in step 1408. Alternatively, the electronic tag may include data corresponding to substantially all relevant information and the information may be inherently transferred by the transfer of the electronic tag physically associated with the at least one plant.

The trading partner to which the at least one plant and associated electronic tag is transferred may include an organization that purchases the at least one plant. The purchase may include a monetary transaction or alternatively may include consideration other than money.

The electronic tag and the package may be configured to provide interrogation access during retention by at least two trading partners. The electronic tag and the package may further be configured to provide interrogation access during at least one physical transfer between trading partners. The electronic tag and the package may further be configured for association with the at least one plant during a period spanning a purchase by an end customer.

The process 1408 may then be repeated by the trading partner or consumer to which the at least one plant was transferred in step 1410.

FIG. 15 is a flow chart illustrating a process 1501 for receiving at least one plant with an associated electronic tag and interrogating the electronic tag to receive information corresponding to the at least one plant, according to an embodiment.

Beginning at step 1502 at least one plant including an electronic tag physically associated with at the least one plant is received. For example, the at least one plant may be received from a trading partner. The electronic tag may include a package providing self-contained physical association with the at least one plant. The electronic tag may be directly physically associated with the at least one plant. The electronic tag may be physically associated with an object that is, in turn, physically associated directly with the at least one plant. For example, the electronic tag may be physically coupled to a plant container or into a root space.

The package for the electronic tag may include an integral tie, an attached elastic band, a plant stake, a plant label, a plant marker, a plant pot, a decorative pot, a hanging pot, a fiber pot, a peat pot, a coir pot, a plant tray, a seed flat, a starter tray, a plug tray, a propagation tray, a hydroponics container, a biodegradable material, a soil-born capsule, a non-soil potting mix-born capsule, a soil amendment-born capsule, a rooting medium-born capsule, a seed package, a bare root bag, a plant variety tag, a spike, a staple, a root ball wrap, burlap fabric, a seed mat, a fertilizer-born capsule, a chemical-born capsule, or a hydroponics-immersed capsule.

The electronic tag may include a package including printed indicia corresponding to the at least one plant. The printed indicia includes at least one of a species name, a cross name, plant care instructions, a database location, an image of at least one mature plant, or an image of a bloom corresponding to the at least one plant.

The electronic tag may include a package configured to protect the electronic tag from sunlight, moisture, water, heat, cold, shock, vibration, pH variation, herbicide, and/or fertilizer. The electronic tag may include a package configured to biodegrade after a completion of passage of the at least one plant through at least a portion of a supply chain.

Optionally, the electronic tag may be interrogated when the at least one plant is received. Referring to FIG. 1, the interrogation may trigger an automatic transmission of receipt acknowledgement or payment for the at least one plant. To do this, a computer program running on a networked resource may receive an identity corresponding to the at least one plant from an electronic tag interrogator. The computer program may cache and accumulate the identities of a batch of received plants. At times, for example at the end of each business day, the program may then initiate an electronic funds transfer or otherwise make a payment to the supply partner that provided the at least one plant and associated electronic tag.

Proceeding to optional step 1504, information related to the at least one plant may be received from the trading partner from which the plant was received. As described above, an explicit optional step 1504 may be especially appropriate when the electronic tag is a read-only electronic tag or when the electronic tag includes data corresponding to less than all the information related to the at least one plant.

Step 1504 may be accomplished automatically. For example, when the electronic tag is interrogated, a computer program may check to see if information related to the corresponding at least one plant is present in an external database. When the information is not present in the external database, the program may query a second external database, for example a database maintained by the trading partner from which the at least one plant and associated electronic tag were received, and copy or move information from the second external database to an external database maintained by the current owner, processor, or maintainer of the at least one plant.

The process 1501 then proceeds to step 1408, which may be embodied substantially as described above. Similarly, steps 1410 and/or 1412 may be repeated as described above.

The foregoing specific exemplary processes and/or devices and/or technologies are representative of more general processes and/or devices and/or technologies taught elsewhere herein, such as in the claims filed herewith and/or elsewhere in the present application.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). The subject matter described herein may be implemented in an analog or digital fashion or some combination thereof.

The reader will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. A typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described components (e.g., steps), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

With respect to the use of substantially any plural and/or singular terms herein, the reader may translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

In some instances, one or more components may be referred to herein as "configured to." Those skilled in the art will recognize that "configured to" can generally encompass active-state components and/or inactive-state components and/or standby-state components, etc. unless context requires otherwise.

While particular aspects of the present subject matter described herein have been shown and described, it will be apparent that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). If a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

With respect to the appended claims, those skilled in the art will appreciate that recited operations therein may generally be performed in any order. Examples of such alternate orderings may include overlapping, interleaved, interrupted, reordered, incremental, preparatory, supplemental, simultaneous, reverse, or other variant orderings, unless context dictates otherwise. With respect to context, even terms like "responsive to," "related to," or other past-tense adjectives are generally not intended to exclude such variants, unless context dictates otherwise.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A system for tracking at least one plant, comprising:
    an electronic tag including an interrogation interface and memory circuitry, the electronic tag further including at least one of a radio frequency tag, a passive radio frequency tag, an active radio frequency tag, a backscatter radio frequency tag, a half-duplex radio frequency tag, a full-duplex radio frequency tag, a touch memory device, a proximity card, a photonic tag, or a smart card; and
    a package for the electronic tag, the package being configured to protect the electronic tag from at least one environment including the at least one plant and at least one of moisture, water, pH variation, corresponding to herbicide application, or corresponding to fertilizer application, the package further configured to biodegrade after a completion of passage of the at least one plant through at least a portion of a supply chain, and the package additionally further configured for self-contained physical association with at least one corresponding plant.

2. The system of claim 1, wherein the electronic tag is configured to receive data across the interrogation interface and store the data in the memory circuitry.

3. The system of claim 1, wherein the electronic tag is configured to transmit data from the memory circuitry across the interrogation interface responsive to receipt of an interrogation signal.

4. The system of claim 1, wherein the interrogation interface and memory circuitry are disposed substantially on an integrated circuit.

5. The system of claim 1, wherein the package includes at least one of an integral tie, an attached elastic band, a plant stake, a plant label, a plant marker, a plant pot, a decorative pot, a hanging pot, a fiber pot, a peat pot, a coir pot, a plant tray, a seed flat, a starter tray, a plug tray, a propagation tray, a hydroponics container, a biodegradable material, a soil-born capsule, a non-soil potting mix-born capsule, a soil amendment-born capsule, a rooting medium-born capsule, a seed package, a bare root bag, a plant variety tag, a spike, a staple, a root ball wrap, burlap fabric, a seed mat, a fertilizer-born capsule, a chemical-born capsule, or a hydroponics-immersed capsule.

6. The system of claim 1, wherein the package further includes printed indicia corresponding to the at least one plant.

7. The system of claim 6, wherein the printed indicia includes at least one of a species name, a cross name, plant care instructions, a database location, a plant supplier name, an image of at least one mature plant, or an image of a bloom corresponding to the at least one plant.

8. The system of claim 1, wherein the package is configured for self-contained physical association with the at least one corresponding plant while the at least one plant is transferred between at least two trading partners of a plant supply chain.

9. The system of claim 8, wherein the at least two trading partners include at least two of a first farm, a second farm, a first nursery, a second nursery, a first wholesaler, a second wholesaler, a first transporter, a second transporter, a first warehouse, a second warehouse, a first retailer, a second retailer, or a consumer.

10. The system of claim 8, wherein the at least two trading partners include a second organization that purchases the at least one plant from a first organization.

11. The system of claim 10, wherein the purchase includes consideration other than money.

12. The system of claim 8, wherein the package is configured to provide interrogation access during retention by at least two trading partners.

13. The system of claim 8, wherein the package is configured to provide interrogation access during at least one physical transfer between trading partners.

14. The system of claim 1, wherein the package is configured for association with the at least one plant during a period spanning a purchase by an end customer.

15. The system of claim 1, wherein the package is configured to provide at least one of biocompatibility, compostability, reduced danger during processing, resistance to chemical assault, resistance to physical assault, improved installation characteristics, improved interrogation performance, or improved aesthetic appearance.

16. The system of claim 1, wherein the at least one corresponding plant includes at least one of at least one seed, cutting, rhizome, bulb, corm, tuber, annual, biennial, cut flower, perennial, grass, creeper, climber, vine, fern, shrub, bush, or tree.

17. The system of claim 1, wherein the package includes a moisture-absorbing open cell foam configured to provide a more constant water supply to the roots of the at least one plant.

18. The system of claim 1, wherein the package includes a mesh or fertilizer-coated mesh.

19. The system of claim 1, wherein the package is configured to be embedded in the at least one plant.

20. A method for tracking at least one plant, comprising:
    receiving an electronic tag including an interrogation interface and electronic memory circuitry in a package,
        the package being configured to protect the electronic tag from at least one environment including the at least one plant, and at least one of moisture, water, pH variation, corresponding to herbicide application, or corresponding to fertilizer application,
        the package further configured to biodegrade after a completion of passage of the at least one plant through at least a portion of a supply chain, and
        the package additionally further configured for self-contained physical association with the at least one plant; and
    physically associating the electronic tag, with the at least one plant such that the electronic tag remains physically associated with the at least one plant during transfer to at least one trading partner of a plant supply chain.

21. The method of claim 20, wherein the package configured for self-contained physical association with the at least one plant includes a coupling formed integrally with the package for permanent or semi-permanent association with a plant or a group of plants.

22. The method of claim 20, further comprising:
    writing data corresponding to the at least one plant to the electronic tag.

23. The method of claim 20, wherein the memory circuitry of the electronic tag includes data corresponding to the at least one plant.

24. The method of claim 20, wherein the memory circuitry of the electronic tag includes identification data, and further comprising:
writing information corresponding to the at least one plant to an external database such that the information is correlated to the identification data.

25. The method of claim 20, wherein the electronic tag is directly physically associated with the at least one plant.

26. The method of claim 20, wherein the electronic tag is physically associated with an object that is, in turn, physically associated directly with the at least one plant.

27. The method of claim 20, further comprising:
associating data corresponding to the at least one plant with the electronic tag; and
automatically transferring the associated data to at least one trading partner with the transfer of the at least one plant.

28. The method of claim 27, wherein associating data with the electronic tag includes writing data related to the at least one plant to the electronic tag via the interrogation interface.

29. The method of claim 27, wherein associating data with the electronic tag includes writing data related to the at least one plant to a database to which the electronic tag is correlated.

30. The method of claim 27, wherein the package includes at least one of an integral tie, an attached elastic band, a plant stake, a plant label, a plant marker, a plant pot, a decorative pot, a hanging pot, a fiber pot, a peat pot, a coir pot, a plant tray, a seed flat, a starter tray, a plug tray, a propagation tray, a hydroponics container, a biodegradable material, a soil-born capsule, a non-soil potting mix-born capsule, a soil amendment-born capsule, a rooting medium-born capsule, a seed package, a bare root bag, a plant variety tag, a spike, a staple, a root ball wrap, burlap fabric, a seed mat, a fertilizer-born capsule, a chemical-born capsule, or a hydroponics-immersed capsule.

31. The method of claim 20, wherein the package further includes printed indicia.

32. The method of claim 31, wherein the printed indicia includes at least one of a species name, a cross name, plant care instructions, a database location, a plant supplier name, an image of at least one mature plant, or an image of a bloom corresponding to the at least one plant.

33. The method of claim 20, wherein the at least one trading partner includes at least one of a farm, a nursery, a wholesaler, a transporter, a warehouse, a retailer, or a consumer.

34. The method of claim 20, wherein the at least one trading partner includes an organization that purchases the at least one plant.

35. The method of claim 34, wherein the purchase includes consideration other than money.

36. The method of claim 20, wherein the electronic tag is configured to provide interrogation access during retention by at least two trading partners.

37. The method of claim 20, wherein the electronic tag is configured to provide interrogation access during at least one physical transfer between trading partners.

38. The method of claim 20, wherein the package is configured for association with the at least one plant during a period spanning a purchase by an end customer.

39. The method of claim 20, wherein the package is configured to provide at least one of biocompatibility, compostability, biodegradability, reduced danger during processing, resistance to chemical assault, resistance to physical assault, improved installation characteristics, improved interrogation performance, or improved aesthetic appearance.

40. The method of claim 20, wherein the at least one plant includes at least one of at least one seed, cutting, rhizome, bulb, corm, tuber, annual, biennial, cut flower, perennial, grass, creeper, climber, vine, fern, shrub, bush, or tree.

41. The method of claim 20, further comprising:
transferring the at least one plant with the associated electronic tag to the trading partner; and
receiving an acknowledgement when the electronic tag is interrogated by the trading partner.

42. A method for tracking at least one plant, comprising:
receiving at least one plant including an electronic tag physically associated with the at least one plant, the electronic tag including at least one of a radio frequency tag, a passive radio frequency tag, an active radio frequency tag, a backscatter radio frequency tag, a half-duplex radio frequency tag, a full-duplex radio frequency tag, a touch memory device, a proximity card, a photonic tag, or a smart card; and
interrogating the electronic tag to receive information corresponding to the at least one plant, the electronic tag including a package configured to protect the electronic tag from an environment of the at least one plant, moisture, water, pH variation, corresponding to herbicide application, or corresponding to fertilizer application, the package further configured to biodegrade, and the package additionally further providing self-contained physical association of the electronic tag with the at least one plant.

43. The method of claim 42, wherein the electronic tag is directly physically associated with the at least one plant.

44. The method of claim 42, wherein the electronic tag is physically associated with an object that is, in turn, physically associated directly with the at least one plant.

45. The method of claim 42, wherein the package includes at least one of an integral tie, an attached elastic band, a plant stake, a plant label, a plant marker, a plant pot, a decorative pot, a hanging pot, a fiber pot, a peat pot, a coir pot, a plant tray, a seed flat, a starter tray, a plug tray, a propagation tray, a hydroponics container, a biodegradable material, a soil-born capsule, a non-soil potting mix-born capsule, a soil amendment-born capsule, a rooting medium-born capsule, a seed package, a bare root bag, a plant variety tag, a spike, a staple, a root ball wrap, burlap fabric, a seed mat, a fertilizer-born capsule, a chemical-born capsule, or a hydroponics-immersed capsule.

46. The method of claim 42, wherein the electronic tag includes a package including printed indicia corresponding to the at least one plant.

47. The method of claim 46, wherein the printed indicia includes at least one of a species name, a cross name, plant care instructions, a database location, an image of at least one mature plant, or an image of a bloom corresponding to the at least one plant.

48. The method of claim 42, wherein the electronic tag includes a package configured to protect the electronic tag from at least one environment including sunlight, moisture, water, heat, cold, shock, vibration, pH variation, corresponding to herbicide application, or corresponding to fertilizer application.

49. The method of claim 42, wherein the electronic tag includes a package configured to biodegrade after a completion of passage of the at least one plant through at least a portion of a supply chain.

50. The method of claim 42, wherein the memory circuitry of the electronic tag includes data corresponding to the at least one plant.

51. The method of claim 42 wherein the memory circuitry of the electronic tag includes identification data, and further comprising:

reading information corresponding to the at least one plant from an external database correlated to the identification data.

52. The method of claim 42, wherein the trading partner includes at least one of a farm, a nursery, a wholesaler, a transporter, a warehouse, a retailer, or a consumer.

53. The method of claim 42, wherein the at least one plant is received from a trading partner.

54. The method of claim 53, further comprising:

transmitting a receipt acknowledgement to the trading partner after interrogating the electronic tag.

55. The method of claim 54, further comprising:

automatically compensating the trading partner for the value of the at least one plant using money or consideration other than money upon interrogating the electronic tag.

56. The method of claim 42, wherein the electronic tag includes a package configured for association with the at least one plant during a period spanning a subsequent sale of the at least one plant.

57. The method of claim 42, wherein the at least one corresponding plant includes at least one of at least one seed, cutting, rhizome, bulb, corm, tuber, annual, biennial, cut flower, perennial, grass, creeper, climber, vine, fern, shrub, bush, or tree.

58. A system for tracking at least one plant, comprising:

an electronic tag including an interrogation interface and memory circuitry; and a package embedding the electronic tag, the package configured as a plant container co-molded with the electronic tag or a screw body configured to be attached to the at least one plant, the package further configured to protect the electronic tag from the at least one plant and at least one of moisture, water, pH variation, corresponding to herbicide application, or corresponding to fertilizer application, and the package additionally further configured to biodegrade after a completion of passage of the at least one plant through at least a portion of a supply chain.

* * * * *